Aug. 3, 1948.  J. G. JUHASZ  2,446,332
DIAL HOLDING MEANS FOR WEIGHING SCALES
Filed Jan. 13, 1945  2 Sheets-Sheet 1
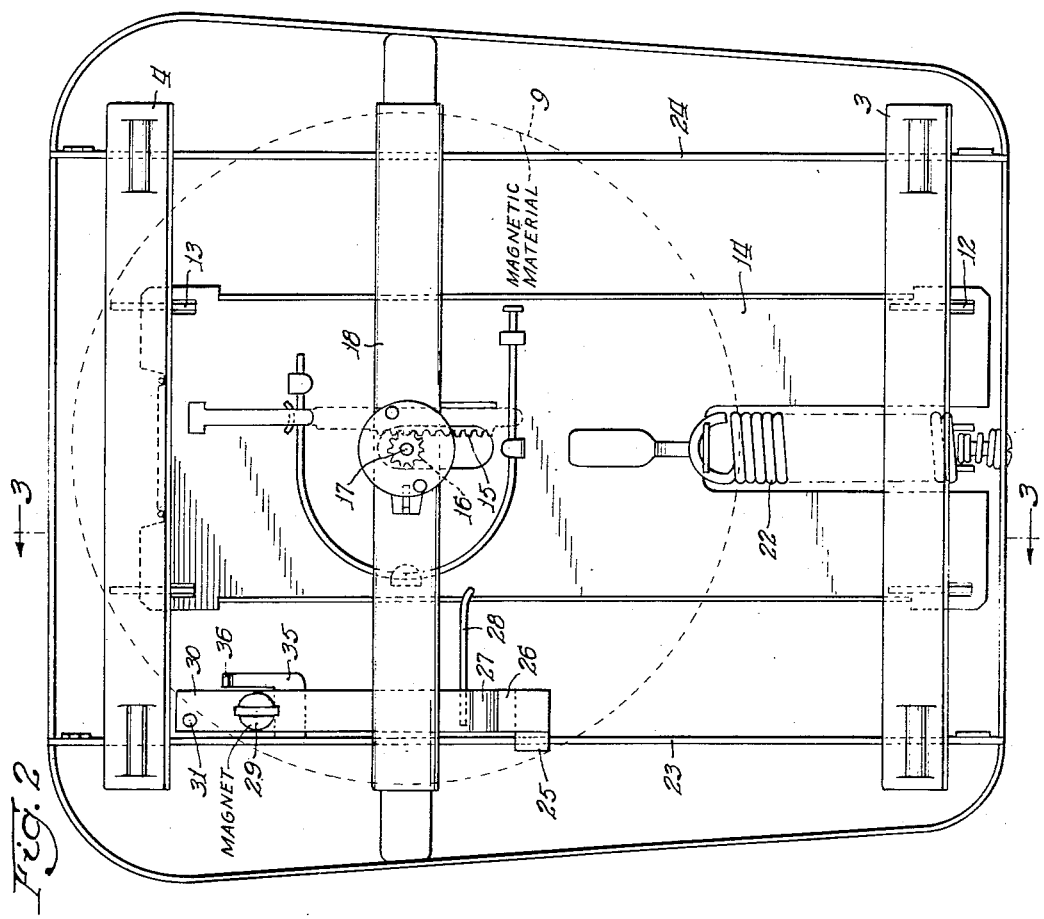
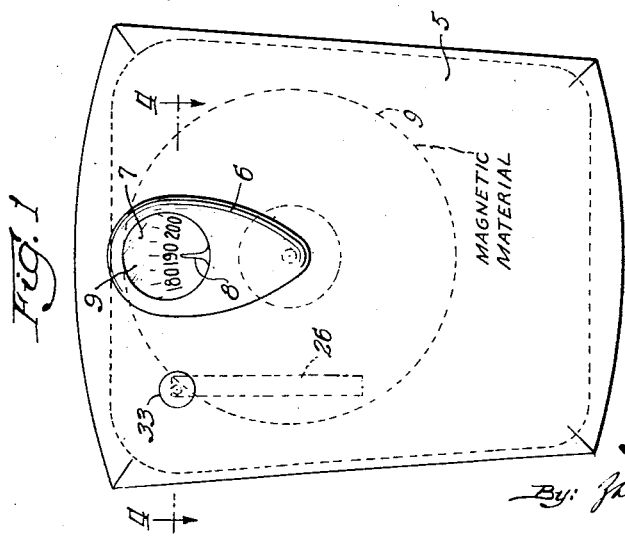
Inventor:
James G. Juhasz Aug. 3, 1948. J. G. JUHASZ 2,446,332
DIAL HOLDING MEANS FOR WEIGHING SCALES
Filed Jan. 13, 1945 2 Sheets-Sheet 2
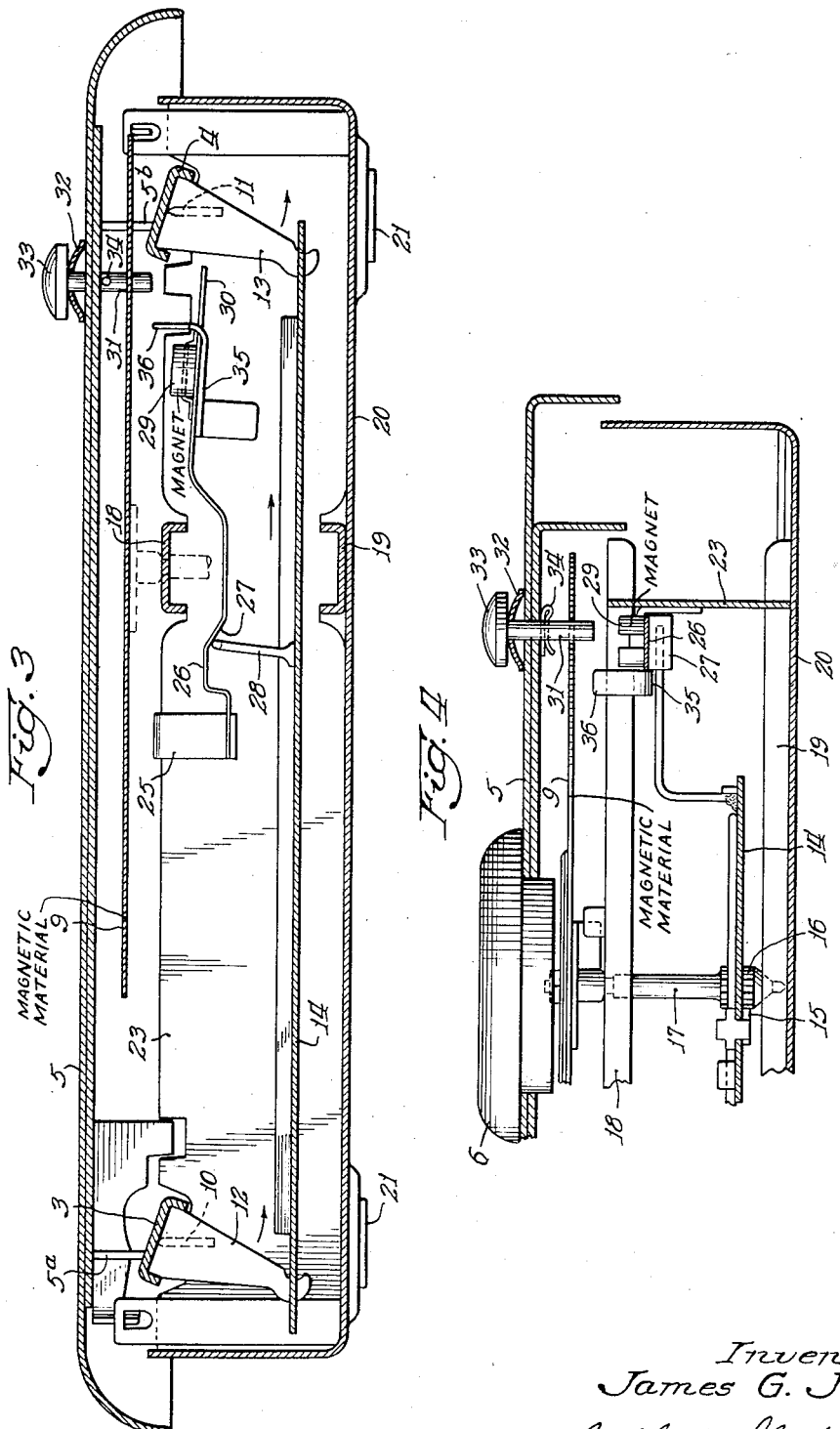
Inventor:
James G. Juhasz Patented Aug. 3, 1948

2,446,332

UNITED STATES PATENT OFFICE 2,446,332

DIAL HOLDING MEANS FOR WEIGHING SCALES

James G. Juhasz, Chicago, Ill., assignor to Borg-Erickson Corporation, Chicago, Ill., a corporation Application January 13, 1945, Serial No. 572,632

5 Claims. (Cl. 265—68)

The present invention relates to weighing scales where the weight indicating device is to be locked in position so that the weight may be removed from the platform and the reading checked afterward. The invention is particularly applicable to that type of weighing scales wherein the platform has provision therein for showing the weight indication which is provided upon a dial beneath the platform. In such scales the dial moves past a pointer to register the weight placed on the platform. It is the purpose of this invention to provide a novel latching device which operates under the control of the foot of the person being weighed.

The invention is particularly applicable to weighing scales shown in the Greenleaf Patent No. 2,047,681. In scales of this character there is a traveling carriage which moves in response to variation in weight placed on the platform. The carriage in turn causes the dial to rotate. According to this invention I utilize the movement of the carriage as a means of operating a mechanism so that a person standing on a scale can actuate a foot piece easily to latch the dial. Thereafter, when the weight is removed from the platform and the reading of the dial has been checked, further actuation of the foot piece releases the dial for return to position.

The nature of my invention will appear more fully from the following description and the accompanying drawings wherein a preferred form of the invention is shown. It should be understood, however, that the drawings and description are illustrative only and should not be taken as limiting the invention except insofar as it is limited by the claims.

In the drawings:

Figure 1 is a plan view of a platform scale embodying the invention;

Figure 2 is an enlarged view of the scale with the platform and indicating dial removed;

Figure 3 is a sectional view taken on the line 3—3 of Figure 2, but showing the platform and indicating dial in place; and Figure 4 is an enlarged fragmentary sectional view taken on the line 4—4 of Figure 1.

Referring now to the drawings, the scale to which my invention is applied embodies a platform 5 having a raised decorative portion 6 which is provided with a window 7 through which a pointer 8 and a dial 9 are visible. The dial 9 is calibrated in pounds to show the weight of an object on the platform 5. The platform 5 is supported by a plurality of bars 3 and 4. The platform has portions 5a and 5b engaging the bars 3 and 4 to turn them about fulcrum points 10 and 11 so as to cause the lever arms 12 and 13 of the bars 3 and 4 to swing in the direction indicated by the arrows in Figure 3.

The lever in turn causes a longitudinal shifting of a framework 14 which is supported beneath the levers 12 and 13. The framework 14 is adapted to move lengthwise and in so doing, it actuates a rack 15 that is carried on the frame so that the rack in turn causes rotation of a pinion 16 on which the dial 9 is supported. The pinion 16 is formed on a spindle 17 that is journaled in a cross bar 18 at a level slightly below the dial 9 and is journaled in a second cross bar 19 at its lower end. The cross bar 19 is welded to a pan shaped support 20 for the scale. The support is provided with feet 21 which desirably may be composed of rubber or of similar material.

As shown in the drawings, longitudinal movement of the frame 14 is opposed by a spring construction indicated generally at 22 in the drawings, and this is the means for measuring the amount of weight that is placed on the platform 5. However, my invention concerns itself primarily with the means for latching the dial 9 against rotation, and the details of the scale, therefore, are of no importance except insofar as they apply to the means by which I latch the dial and release it. No further detailed description of the operation of the scale is believed to be necessary.

The support 20 has two spaced frame pieces 23 and 24. These frame pieces lie outside of the framework 14, and one of them serves to mount one end portion 25 of a latch lever 26. The lever 26 is shaped as shown best in Figure 3 to provide a cam surface 27 which is adapted to cooperate with a bar 28 that is fixed to the framework 14 and adapted to move lengthwise of the lever 26 when the framework is moved by the application of weight to the platform 5. The lever 26 is a spring and is fixedly attached to the clip 25 which in turn is fixed to the member 23. The material of which the lever 26 is made should be a material which can withstand repeated flexing over a long period of time. Such a material as Phosphor bronze spring material is satisfactory.

At a distance remote from the clip 25, the lever 26 carries a permanent magnet 29 preferably of the material sold to the trade under the name of Alnico. Permanent magnets of this material are known to have a long life. The dial 9 is of a magnetic material so that if the permanent magnet 29 gets close enough to it the attraction between the dial and the magnet will be sufficient to overcome the pull of the lever 26 downwardly.

The free end of the lever 26 projects beyond the magnet 29 as shown at 30 so that when the magnet is in engagement with the dial 9, this free end is in engagement with the lower end of a release pin 31 that is mounted on the platform 5. The release pin extends down from the platform just outside of the edge of dial 9. A three pronged spring washer 32 is seated beneath the head 33 of the release pin so as to normally hold the release pin raised to the position shown in Figure 3. The release pin is prevented from falling out by a cotter pin 34. The release pin can be depressed far enough to disengage the magnet 29 from the dial 9. In this fashion any one using the scale can release the dial 9 after the scale reading has been made.

In operation the device functions in the following manner. Assuming that a person desires to be weighed, the first act is to step upon the platform 5 and then apply the toe to the head of the pin 31 until the dial 9 comes to rest. The weight can then be gradually released from the pin 31 and this will permit the spring lever 26 to move the magnet 29 up into contact with the dial 9. The person being weighed can then step off the scale and the reading of the dial will remain, because the dial is locked in position by the magnet 29. To return the dial 9 to zero position it is only necessary to apply weight to the pin 31, sufficient to break the connection between the magnet 29 and the dial 9. It may often occur that the individual weighing himself would not release the dial after having checked the reading. This, however, causes no difficulty because the next person utilizing the scale can step upon the platform then release the dial by applying weight to the pin 31 and, thereafter, lock the dial in position by removing the weight from the pin 31 while he is still upon platform 5. The vertical movements of the magnet 29 are guided by a bracket 35 that is fastened to the frame piece 23. This bracket has a platform portion which limits the downward movement of the free end of the lever 26. It also has an upstanding portion 36 spaced from the frame piece 23 to provide a vertical guide for the free end of the lever arm 26. The frame piece 23 and the bracket 35 are of non-magnetic material so that they do not influence the permanent magnet 29.

From the foregoing description it is believed that the nature and advantages of my invention will be clear to those skilled in this art. Having thus described my invention, I claim:

1. In combination with a scale having a housing and weight platform and a movable weight indicator, said weight indicator including a part, at least, of magnetic material, a magnet, a cam and lever member for moving said magnet toward and away from the magnetic material of said weight indicator, means on a movable part of said scale for engaging the cam of said member and moving the member in a direction to bring the magnet into engagement with the magnetic material of the weight indicator when weight is applied to said platform whereby to provide a magnetic lock for the weight indicator, and a trip member, manually operable to separate the magnet from the magnetic material of the weight indicator.

2. In combination with a scale having a housing and weight platform and a movable weight indicator, said weight indicator including a part, at least, of magnetic material, a magnet, a lever having said magnet mounted thereon, said lever being mounted on a fixed part of the scale, means on a movable part of said scale for engaging said lever and moving it in a direction to bring the magnet thereon into engagement with the magnetic material of the weight indicator when weight is applied to said platform whereby to provide a magnetic lock for the weight indicator and a trip member operable to separate the magnet from the magnetic material of the weight indicator.

3. In combination with a scale having a housing and weight platform and a movable weight indicator, said weight indicator comprising a dial of magnetic material, a magnet, a lever having said magnet mounted thereon adjacent one end thereof and having a cam surface thereon, means mounted on a movable part of said scale for engaging the cam surface and moving the lever in a direction to bring the magnet into engagement with the dial when weight is applied to said platform, and a trip member for releasing the magnet from the dial.

4. In combination with a scale having a housing and weight platform and a movable weight indicator, said weight indicator comprising a dial of magnetic material, a magnet, a lever having said magnet mounted thereon adjacent one end thereof and having a cam surface thereon, means mounted on a movable part of said scale for engaging the cam surface and moving the lever in a direction to bring the magnet into engagement with the dial when weight is applied to said platform, and a trip member for releasing the magnet from the dial, said lever comprising a spring, one end of which is fixed to a stationary part of said scale.

5. In combination with a scale having a housing and weight platform and a movable weight indicator, said weight indicator including a part, at least, of magnetic material, a magnet, means, including a spring, movably mounted on a fixed part of said scale and supporting said magnet for movement into engagement with and away from the part of magnetic material of said weight indicator in a direction transverse to the plane of movement of the weight indicator, whereby to hold the weight indicator stationary when the magnet is engaged with the magnetic material of the weight indicator, means on a movable part of said scale engaging the magnet supporting means and moving it toward the weight indicator to bring the magnet thereon into engagement with the magnetic material of the indicator when weight is applied to the platform, and a manually operable member movably mounted on said platform and operable to move the magnet against the force of said spring in a direction to separate the magnet from said magnetic material.

JAMES G. JUHASZ.

REFERENCES CITED

The following references are of record in the file of this patent:

UNITED STATES PATENTS

| Number | Name | Date |
| --- | --- | --- |
| 2,258,081 | Weckerly | Oct. 7, 1941 |
| 2,326,365 | Kircher | Aug. 10, 1943 |
| 2,354,390 | Lowy | July 25, 1944 |

FOREIGN PATENTS

| Number | Country | Date |
| --- | --- | --- |
| 289,252 | Great Britain | Apr. 26, 1928 |